Jan. 8, 1957 H. J. MORRISON 2,777,019

FEEDBACK AMPLIFIER

Filed Aug. 20, 1952

WITNESSES:

John E. Healy

Wm. T. Wofford

INVENTOR

Heber J. Morrison.

BY

F. E. Browder

ATTORNEY 2,777,019
Patented Jan. 8, 1957

2,777,019

FEEDBACK AMPLIFIER

Heber J. Morrison, Ellicott City, Md., assignor to Westinghouse Electric Corporation, East Pittsburgh, Pa., a corporation of Pennsylvania Application August 20, 1952, Serial No. 305,411
2 Claims. (Cl. 179—171)

My invention relates to amplifiers and in particular relates to amplifiers which must handle currents of frequencies in the lower portion of the audio range and which employ degenerative feedback and output transformers which have ferro-magnetic cores. The audio-frequency amplifiers in modern broadcasting stations are usually of this type.

Amplifiers for voice currents have to handle frequencies covering a wide percentage range with uniformity of gain and phase throughout the range. The meeting of such severe requirements is greatly assisted by the employment of a feedback channel from output to input which impresses a voltage in the input of such magnitude and phase as will reduce the amplification from the value that would exist if this feedback were removed. The magnitude and phase of this feedback depends on the frequency of the current being amplified. While it is easy to so design the channels such that the mid-frequencies in the audio range are of proper phase, there are likely to be among the extreme frequencies of the range some voltages that feed back around the loop to the input in such phase as to cause the amplifier to build up and generate self-oscillations, with intolerable results, such as "motor-boating" and howling. As is shown by Nyquist in an article "Regeneration Theory" in Bell System Technical Journal, vol. 11, page 126, published by Bell Telephone Laboratories, New York city, the criterion for non-existence of self-oscillation is that the gain around the feedback loop shall be less than unity for any frequency for which the phase-shift around the loop is zero or any integral multiple of 360 degrees. As is well known, this criterion does not necessarily apply to the special case of the "conditionally stable amplifier," to which no further reference will be made.

One widely used form of feedback amplifier of the prior art is shown in Fig. 1, in which the feedback voltage is a definite fraction in magnitude of the amplifier output voltage, and with such an arrangement the criterion that loop-gain be less than unity for all frequencies having a phase shift about the loop which is an integral multiple of 360 degrees may well be fulfilled for low power at the output transformer. But when the load grows great enough the iron core of the output transformer will saturate, for some low-frequency voltage component first, decreasing the amplifier load impedance and shifting the phase of the output voltage components sufficiently so that the loop-gain for a 360 degrees shift component exceeds unity and self-oscillation sets in.

It is accordingly one object of my invention to provide an inverse feedback amplifier with a feedback network of a type which will prevent components of low frequency in the output voltage with phase relationship of zero or multiples of 360 degrees from having a gain greater than unity about the feedback loop.

Another object is to provide an inverse feedback amplifier with a feedback network of a type which will prevent self-oscillation at large outputs.

Another object is to provide an inverse feedback amplifier having an output transformer likely to show saturation effects at high loads with a feedback network which tends to suppress self-oscillations when saturation occurs.

Another object is to provide an amplifier having a circuit component which tends to cause rapid current rise at high load with a feedback network which tends to prevent instability of the amplifier at high load.

Still another object is to provide an amplifier having an impedance which tends to decrease at high loads with a feedback network which reacts to prevent instability at such loads.

Yet another object is to provide an amplifier having an output transformer having a tendency to saturation at high loads with a feedback network which provides an inverse feedback rising with increase of load-current components of low frequency but rising substantially less with increase of components of higher frequency.

An important feature of my invention is the use, with an output transformer tending to saturation at high load, of an amplifier having an inverse feedback proportional to output voltage in the case of higher frequency components together with an inverse feedback proportional to current components in the case of low frequencies.

Other objects of my invention will become apparent upon reading the following description taken in connection with the drawings, in which.

Figure 1:
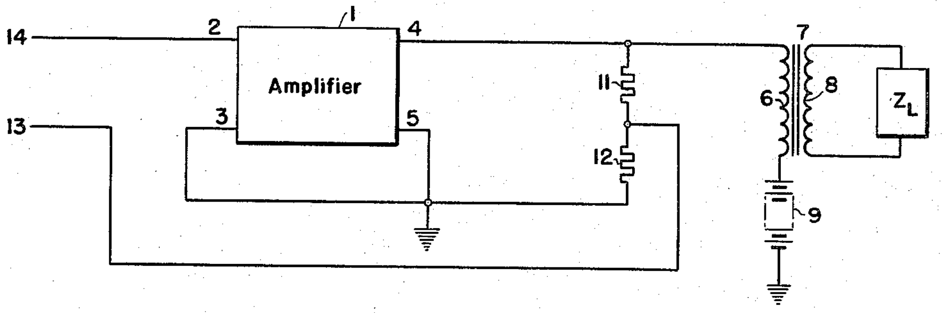
Figure 1 is an illustrative diagram of prior art feedback amplifiers used in the field of my invention.

Referring in detail to Fig. 1 an audio amplifier 1 of conventional type has an input 2, 3 and output terminals 4, 5 of which terminals 3 and 5 may be grounded. Between the terminal 4 and ground is connected the primary winding 6 of an audio output transformer having a ferromagnetic core 7 and a secondary winding 8 connected to a load $Z_L$ which may for example be a broadcast station radio frequency power amplifier. The free terminal of primary winding 6 is connected to the positive pole of a direct current source 9 having its negative pole grounded. Across the terminals 4, 5 is connected serially a pair of resistors 11, 12, to the common junction of which the side 13 of the input channel is connected. The other side 14 of the input channel is connected to input terminal 2 of amplifier 1. The potential drop in resistor 12 is thus in series with the signal coming in from lines 13 and 14. The voltage impressed upon the input terminals 2, 3 is thus the difference of the instantaneous voltage on lines 13, 14 and the instantaneous voltage drop in resistor 12, the latter a real fraction of the voltage on amplifier terminals 4, 5. The voltage component of any frequency at terminals 4, 5 will, in general, be a known complex function of the component of that frequency at terminals 2, 3; and may have any phase relative to the latter depending on its frequency. By proper design of the amplifier 1 the phase of components in the middle range of frequencies of the audio band on resistor 12 is made opposite to their phase on terminals 2, 3 so that there is an inverse feedback for these components.

With conventional design there is little difficulty in designing the amplifier output transformer so that its core remains unsaturated even at the lowest modulating frequencies, and the feedback from resistor 12 is sufficient so that the gain around the amplifier loop is less than unity for any frequency having a phase shift around the loop which is a multiple of 360 degrees, for light loads. However, at higher loads there is a tendency for the transformer core to saturate for the lower frequencies and the voltage of some low frequency feedback from resistor 12 to the input, although reduced in magnitude from the unsaturated value, is shifted in phase in a leading direction due to the larger proportion of reactive current drawn from the amplifier, and causes the loop phase shift to reach 360 degrees at a gain of unity, with self-oscillation and instability of the amplifier circuit a consequence.

Figure 2:
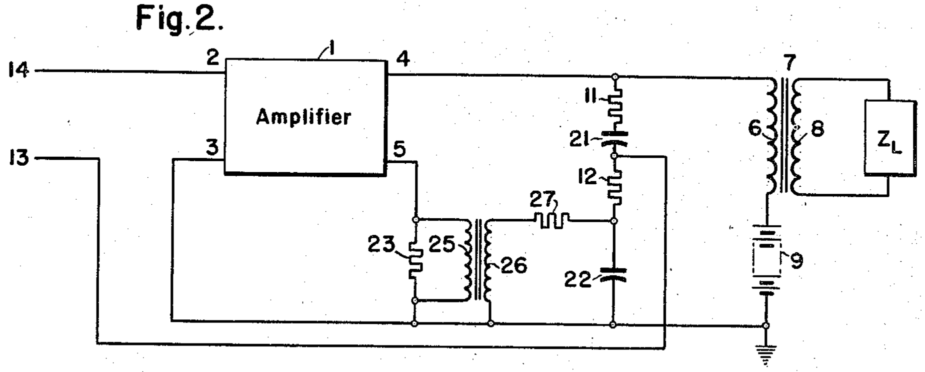
Fig. 2 is a schematic diagram of a typical feedback amplifier embodying my invention.

To avoid this difficulty I have altered the conventional feedback circuit by impressing therein an inverse-voltage which is proportional to output current and is most pronounced at lower frequencies. One suitable circuit for doing this is shown in Fig. 2 in which similar reference numerals indicate circuit elements similar to those already described in Fig. 1. Thus the output terminal 4 of the amplifier is connected to ground through a channel comprising resistors 11, 12 cascaded with capacitors 21, 22. Input line 13 is connected to place resistor 12 and capacitor 22 between it and ground, while output transformer primary 6 is connected from output terminal 4 to ground through D. C. voltage-source 9. Output terminal 5 of amplifier 1 is connected to ground through a resistor 23 which is spanned by a second transformer primary 25 which has a secondary winding 26 connected across capacitor 22 through a resistor 27.

The transformer secondary 26 has induced in it a voltage proportional to the output current from amplifier 1 and sends a current through capacitor 22. The latter has an impedance that is small relative to the resistor 27 except at the lower frequencies. The net result is that at low loads the feedback voltage impressed at terminal 3 is substantially proportional to the amplifier output voltage at terminal 4 which is impressed on the primary 6 of the output transformer for components of all frequencies. As output increases the voltage-drop through capacitor 22 due to the current injected by series transformer secondary 26 is added to the feedback voltage, this component being negligible at small load currents, and also negligible for all except low frequencies. This inverse feedback for the low-frequency components maintains the gain and reduces the phase shift around the amplifier loop for the frequencies pointed out above as causing self-oscillation, and renders the amplifier stable.

Figure 3:
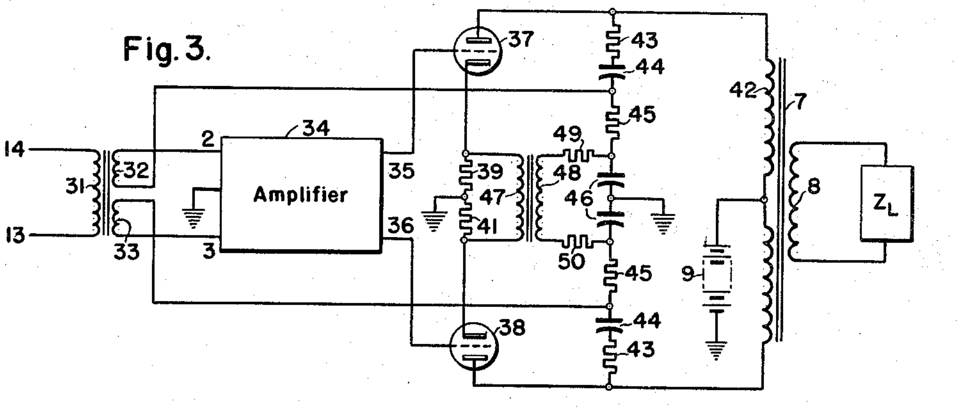
Fig. 3 is a similar diagram of a push-pull amplifier embodying my invention in a preferred form.

For many purposes push-pull amplifiers are particularly useful in the audio-frequency field and I illustrate a preferred circuit for applying the principles of my invention in Fig. 3. The input terminals 13, 14 are connected to the primary 31 of an audio input transformer having secondary windings 32, 33. The upper terminal of secondary 32 is connected to one input terminal 2 of push-pull amplifier 34 and the lower terminal of secondary 33 is connected to the other input terminal 3 of push-pull amplifier 34. Output terminals 35, 36 of amplifier 34 are connected respectively to the grids of a pair of push-pull connected tubes 37, 38 the cathodes of which are respectively connected to ground through a pair of resistors 39, 41. The anodes of tubes 37, 38 are connected to the end terminals of a primary winding 42 of a push-pull output transformer having a ferro-magnetic core 7 and a secondary 8 connected to a load $Z_L$. The positive pole of a D. C. voltage source 9 having its negative pole grounded is connected to the mid-tap of primary 42.

Between ground and the end terminals of winding 42 are connected a pair of channels each comprising, in cascade, a resistor 43, a capacitor 44, a second resistor 45 and a second capacitor 46. The free terminal of secondary 32 is connected to the common junction of the capacitor 44 and resistor 45 which is adjacent tube 37, and the free terminal of secondary 33 is connected to the corresponding junction adjacent tube 38. A transformer primary 47 interconnects the cathodes of tubes

37, 38 and its secondary 48 has its terminals connected through resistors 49, 50 to span the capacitors 46. The cathodes of the input tubes in amplifier 34 are grounded.

It will be seen that transformer primary 47 produces currents in capacitors 46 like that which primary 25 injected into capacitor 22 as was described in connection with Fig. 2; and that the effect of capacitors 46 on the feedback to the input of amplifier 34 will be similar to the effect of capacitor 22 on the input to amplifier 1 in Fig. 2.

I claim as my invention:

1. In combination with a pair of conducting elements adapted for connection to a source of variable frequency signals, an amplifier having first and second input terminals and first and second output terminals, an impedance element connecting the second input terminal with the second output terminal, an output circuit connected between said output terminals and including said impedance element, a circuit channel connected between said first output terminal and the second input terminal, said circuit channel comprising two circuit sections connected in series and having a common junction therebetween, with each of said sections comprising a resistor in series with a capacitor, the capacitor in the one of said sections adjacent said second input terminal being such as to present a high impedance to low frequency signals from said source of signals and a low impedance to high frequency signals from said source, a connection between the junction of said sections and one of said conducting elements, a connection between the first input terminal and the other conducting element, and means for impressing a voltage across said last-named capacitor which is proportional to current flow through said impedance element.

2. In combination with a pair of conducting elements adapted for connection to a source of variable frequency signals, an amplifier having first and second input terminals and first and second output terminals, an impedance element connecting the second input terminal with the second output terminal, an output circuit connected between said output terminals and including said impedance element, a circuit channel connected between said first output terminal and the second input terminal, said circuit channel comprising two circuit sections connected in series and having a common junction therebetween, with each of said sections comprising a resistor in series with a capacitor, the capacitor in the one of said sections adjacent said second input terminal being such as to present a high impedance to low frequency signals from said source of signals and a low impedance to high frequency signals from said source, a connection between the junction of said sections and one of said conducting elements, a connection between the first input terminal and the other conducting element, and a transformer having its primary winding connected across said impedance element and its secondary winding connected across the capacitor of said one section for impressing a voltage across said last-named capacitor which is proportional to current flow through said impedance element.

References Cited in the file of this patent

UNITED STATES PATENTS

| | | |
|---|---|---|
| 2,271,291 | Edson | Jan. 27, 1942 |
| 2,313,962 | Oman | Mar. 16, 1943 |

FOREIGN PATENTS

| | | |
|---|---|---|
| 107,664 | Australia | June 22, 1939 |

OTHER REFERENCES

Terman text, "Radio Engineering," 3d ed., page 321, published 1947 by McGraw-Hill Book Co., N. Y.